R. O. THOMPSON.
STORAGE VESSEL.
APPLICATION FILED APR. 30, 1915.
1,181,622. Patented May 2, 1916.
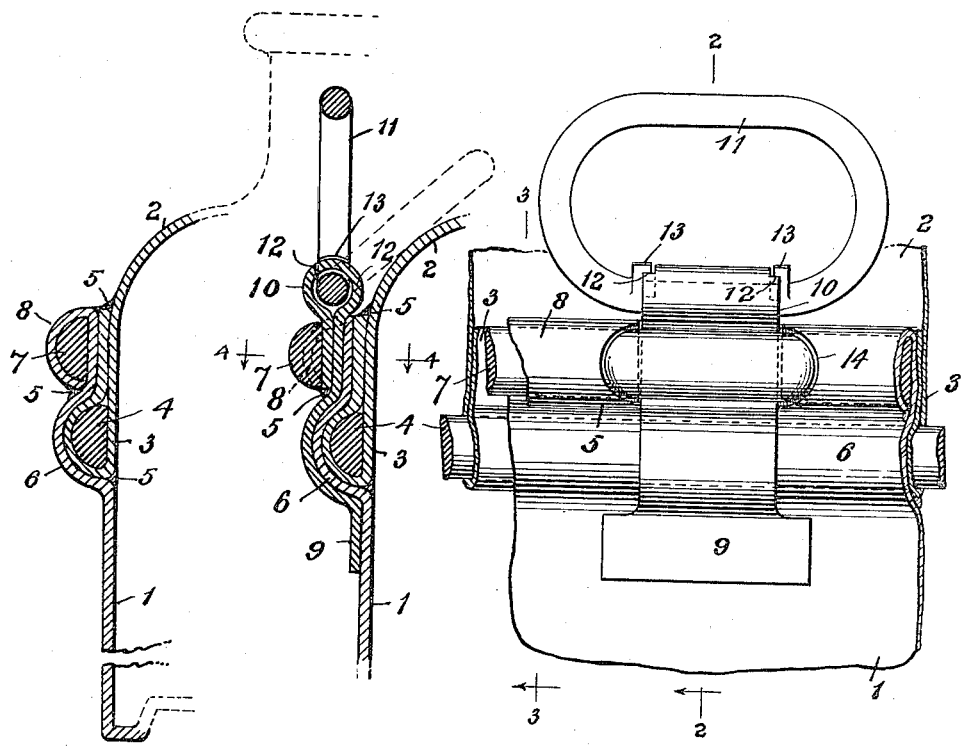
Fig.3  Fig.2  Fig.1
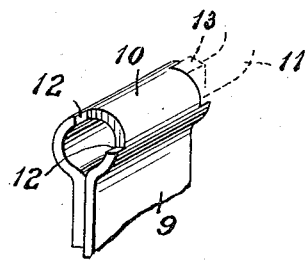
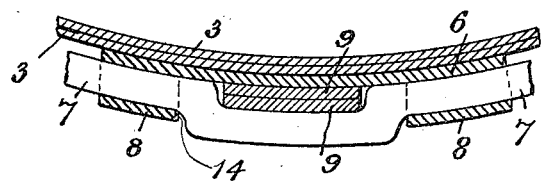
Fig.5
WITNESS
Joshua Bergstrand
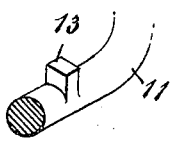
Fig.6
INVENTOR
Robert O. Thompson
BY
William F. Nickel
ATTORNEY

UNITED STATES PATENT OFFICE.

ROBERT O. THOMPSON, OF CAMPBELL HALL, NEW YORK.

STORAGE VESSEL.

1,181,622.  Specification of Letters Patent.  Patented May 2, 1916.

Original application filed July 23, 1914, Serial No. 852,583. Divided and this application filed April 30, 1915. Serial No. 24,870.

*To all whom it may concern:*

Be it known that I, ROBERT O. THOMPSON, a citizen of the United States, and a resident of Campbell Hall, in the county of Orange and State of New York, have invented certain new and useful Improvements in Storage Vessels, of which the following is a specification.

I have invented an improvement in storage vessels of the kind disclosed in my prior application Serial No. 852,583, filed July 23, 1914, of which this application is a division; and my principal object is to design a vessel, such as a milk can, which is made up of a main section or body and a cover section or bowl, united together by a reinforced leakproof joint; and which is provided with handles so mounted on the vessel as to be practically incapable of getting broken or otherwise damaged when the can is in use, and so combined with the reinforced joint that the weight of the vessel and its contents is always exerted on the handles, not through the joint, but directly, whereby the strength and durability of the can are greatly increased.

The above and other objects and advantages of my improvement will appear from the following description, taken in connection with the accompanying drawings; and be particularly pointed out in the appended claims.

I of course desire to have it understood that this specification is to be taken as illustrative only and that I am not to be confined in the practice of my invention to the exact structural details shown and described. In fact, the drawings are intended to show but one embodiment of my improved construction and I reserve the right to make any changes in the shape, size and arrangement of the various parts that are within the scope and spirit of my invention, and within the general meaning of the terms of the claims.

On said drawings:—Figure 1 is a side elevation of one form of my invention. Fig. 2 is a sectional view taken on the line 2—2 of Fig. 1: Fig. 3 is a sectional view taken on the line 3—3 of Fig. 1: Fig. 4 is a sectional view taken on the line 4—4 of Fig. 2: Fig. 5 is a perspective view showing how the handles on my improved can are mounted; and Fig. 6 is a similar view of a part of a handle.

In the detailed description of the drawings the same characters of reference are employed in connection with the same parts throughout.

The numeral 1 indicates the main section or body of a milk can; and 2 the cover section or bowl which constitutes the top of the can. At its upper portion the body is expanded somewhat, for the purpose of receiving the lower portion 3 of the bowl; which lower portion has a reinforcement, as by turning it up over a band 4. This band is preferably semi-circular in cross section, with its flat face against the outside of the bowl 2, and the portion 3 is bent upward and outward, and then inward and upward to inclose the band 4 completely, and be in direct contact at its upper edge with the exterior of the bowl, just below the shoulder of the latter. I employ solder 5 to close the seam between the body and the bowl on the inside of the can and make the joint leakproof; and it will be apparent that no force or shock short of that needed to burst the can utterly is capable of damaging or breaking the seal of the joint from without.

At its expanded upper portion 6 the body 1 is also bent upward and outward, and then inward and upward, to be in snug contact with the whole of the upturned portion of the bowl 2; and it is encircled above the band 4 by a similar band 7. The upper edge of the portion 6 is turned down as at 8, to cover the curved outer face of the band 7, and is joined by solder 5 to the portion 6 adjacent the lower edge of the band 7. Solder 5 is also employed to close the seams between the upper edge of the portion 3 and the outside of the bowl 2, and this edge and the adjacent portion 6. As a result I obtain a perfectly leakproof joint of the greatest possible strength and least liability to damage, as set forth in my application above referred to.

The invention herein resides more particularly in the type of handle employed, and the manner of connecting the handle with the reinforced joint, as will now be described. Preferably two handles are placed on the can, at opposite points; and the upper band 7 is bent outward at such points to allow straps supporting the handles to pass behind it, and between it and the portion 6. These straps are indicated by the numeral 9, and the downturned upper edge 8 is recessed or cut away in order to make room for the outward bent portions of the band 7 in question. Each strap may have the form of an inverted T; that is, it will have a cross bar at the lower end which will rest flatly against the outside of the body of the can below the expanded portion 6. Above this cross bar the strap will be bent to conform closely to the curvature of the portion 6, which forms a peripheral rib adjacent the band 4, and then passed behind the band 7 and above the extreme upper edge of the portion 3. It is then returned upon itself to make the bearing 10, and the extremity inserted behind the band 7 in contact with the inner flat face thereof. The straps 9 further, may be riveted to the body; but are preferably secured by solder; and, as will be understood, solder may be employed along the portion 6 back of the straps, below the bearings 10; and at the ends of this bearing; and between the top of the band 7 and the front of the straps; likewise between the ends of the outward bent portions of the band and the recessed portions of the edge 8; and at the lower edge of the outward bent portions of the band and the adjacent edge of the returned end of the straps flush therewith; in order that every seam may be filled completely.

It will now be clear that when the can is lifted by handles in the bearings 10, the weight of the can and its contents is exerted on the handles, through the body 1; and not at all through the cover section or bowl 2. Hence there is no tendency to pull the body 1 and bowl 2 apart, as would be the case if the handles were connected to the bowl only. The likelihood of injury to the joint by lifting and moving the can about, no matter how roughly or carelessly, is thus removed; and the bands 4 and 7 prevent all damage to the joint due to jars, blows and shocks on the outside of the can. Further, the form of the straps 9 and the manner of securing the straps tightly against the portions 6 and behind the upper band 7 make the tearing of the straps loose impossible.

In each bearing 10 is movably mounted a handle 11 having the form of a metal loop. These handles are free to move in their bearings through a certain angle and are so held in the bearings that they will automatically fall inward and rest upon the shoulder of the bowl 2 when they are not needed, and be out of harm's way. Each bearing 10 has shoulders 12 at each end for this purpose. The upper or outer shoulders 12 limit the play of the handles and keep them from moving beyond vertical position; while the lower or inner shoulders may be so placed as to have the handles come in contact therewith when the handles are in the position shown in broken lines on Fig. 2, or if preferred they may hold the handles just out of contact with the bowl of the vessel. The handles each have a pair of projections 13 thereon to engage the shoulders 12. Numeral 14 indicates the recessed portions of the edge 8 in which are the bent-out parts of the band 7.

When the can is to be lifted the handles are moved into vertical position, with the projections engaging the upper shoulders. After the can is set down the handles fall inward; the slightest jar being sufficient to produce this result. If desired the upper shoulders 12 may be placed so as to stop the handles just in advance of vertical position, in order that the handles may more easily and surely fall inward by gravity when released. Hence the handles 11 are always out of danger when the can is being shipped or otherwise in use, as they normally rest on the bowl 2 and are therefore not likely to be struck by any foreign body and broken or damaged. They also enable the can to be lifted without any of the weight being exerted on the joint between the bowl and the body; and by passing behind the band 7 and over the outcurved portion 6, which makes a rib adjacent the band 4, the straps with the handles cannot be torn or otherwise displaced from operative position.

I wish to point out particularly in closing that when the can is lifted, the pull on the handles and straps is not upon the solder or rivets which hold the straps to the can, but upon the band 7 and to some extent also upon the portion 6 where it bulges outward opposite the band 4. The entire strength of the band 7 and the overturned upper edge of the body thus comes into play; giving excellent and long continued service.

Having described my invention what I believe to be new and desire to secure and protect by Letters Patent of the United States is:—

1. A storage vessel comprising a top having a circumferential shoulder, a bearing carried by said vessel adjacent said shoulder, and a handle received in said bearing, said bearing being shaped to permit said handle to drop inward against said shoulder to prevent breakage when the handle is not in use and to prevent movement of said handle in the opposite direction beyond vertical position, whereby said handle will normally rest upon said shoulder.

2. A storage vessel comprising a top having a circumferential shoulder, a bearing carried by said vessel adjacent said shoulder, a handle received in said bearing, said bearing having a shoulder, and said handle having a projection to engage the last named shoulder, the shoulder in the bearing and the projection on the handle preventing movement of the handle beyond vertical position, but permitting the handle to move freely in the opposite direction whereby the handle will normally rest upon said shoulder.

3. A storage vessel comprising a body and a bowl united by a reinforced leakproof joint, a strap combined with the joint and connected to the body directly, the strap having a bearing, and a handle in said bearing, whereby the weight of the vessel and its contents may come on the handle directly through said body, the handle and the bearing engaging each other so as to cause the handle to be normally out of projecting position.

4. A storage vessel comprising a body and a bowl, the lower portion of the bowl being encircled by a strengthening band and being turned up over said bowl, and the upper portion of the body being expanded to receive the lower portion of the bowl with said band thereon, a strengthening band encircling the body above the first band and holding the body and the bowl in snug engagement, a strap conforming to the curvature of the upper portion of the body and passing between the same and the second band, the strap having a bearing with shoulders at its ends, and a handle having projections to engage the shoulders in said bearing, whereby when the vessel is lifted the weight of the same and its contents is exerted through the body directly on the handles, the handles being prevented from moving outward beyond the vertical by the shoulders, and being permitted to drop inward toward the exterior of the bowl when not in use.

5. A storage vessel comprising a body and a top therefor, the top having its lower portion extending outward and upward along the outer surface of said lower portion, the body having its upper portion extending outward and upward, and then inward and upward to form a snug fit with the lower portion of the body, and means secured to the upper portion of the body for enabling the vessel to be lifted, whereby the weight of the vessel and its contents can be borne by said body.

6. A storage vessel comprising a body and a top therefor, the top having its lower portion encircled by a reinforcing band, the said lower portion being turned upward over said band, the body having its upper portion expanded to receive said lower portion and said band, a reinforcing band encircling the edge of said upper portion and located above the first band to hold the body and top in snug engagement, and handle straps secured to the upper portion of the body and passing beneath the upper band.

7. A storage vessel comprising a body and a top therefor, the top having its lower portion encircled by a reinforcing band, said lower portion being turned up over said band, the body having its upper portion expanded to receive said lower portion and said band, a reinforcing band encircling the edge of the upper portion located above the first band to hold the body and top in snug engagement, and handle straps secured to the upper portion of the body and passing beneath the upper band, the edge of the upper portion of the body being turned out over the upper band.

8. A storage vessel comprising a body and a top therefor, the top having its lower portion encircled by a reinforcing band, said lower portion being turned up over said band, the body having its upper portion expanded to receive said lower portion and said band, a reinforcing band encircling the edge of the upper portion located above the first band to hold the body and top in snug engagement, handle straps secured to the upper portion of the body and passing beneath the upper band, the edge of the upper portion of the body being turned out over the upper band, and a handle pivotally mounted in each of said handle straps, each handle having a projection and each strap having a shoulder, said shoulder and said projections preventing the handle from moving outward beyond vertical position, but permitting the handles to move freely in the opposite direction whereby the handles will normally rest against the top.

9. A storage vessel comprising a body and a top therefor, the body having its upper portion expanded to receive the lower portion of the top, a reinforcing band encircling the upper portion of the body and a handle strap secured to the body and located beneath said band.

10. A storage vessel comprising a body and a top therefor, the upper portion of the body being expanded to receive the lower portion of the top, said body having a circumferential rib extending around its upper portion, a reinforcing band encircling said upper portion above said rib, and a handle strap secured to said body, said strap crossing said rib and conforming to the curvature of the same and passing beneath said band.

Signed at Campbell Hall, in the county of Orange and State of New York, this 9th day of April, A. D. 1915.

ROBERT O. THOMPSON.

Witness:
J. F. HALSTEAD.